United States Patent
Kim et al.

(10) Patent No.: US 11,780,729 B2
(45) Date of Patent: Oct. 10, 2023

(54) METHOD FOR GENERATING HYDROGEN

(71) Applicants: HYUNDAI MOTOR COMPANY, Seoul (KR); KIA CORPORATION, Seoul (KR); KOREA INSTITUTE OF SCIENCE AND TECHNOLOGY, Seoul (KR)

(72) Inventors: Pyung Soon Kim, Suwon-si (KR); Jin Woo Choung, Suwon-si (KR); Jihui Seo, Ulsan (KR); Hyuntae Sohn, Seoul (KR); Yu-Jin Lee, Seoul (KR); Hyangsoo Jeong, Seoul (KR); Yoondo Kim, Seoul (KR); Chang Won Yoon, Seoul (KR); Yongmin Kim, Seoul (KR)

(73) Assignees: HYUNDAI MOTOR COMPANY, Seoul (KR); KIA CORPORATION, Seoul (KR); KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 31 days.

(21) Appl. No.: 17/348,539

(22) Filed: Jun. 15, 2021

(65) Prior Publication Data
US 2022/0250903 A1    Aug. 11, 2022

(30) Foreign Application Priority Data

Feb. 8, 2021   (KR) ........................ 10-2021-0017385

(51) Int. Cl.
*C01B 3/06* (2006.01)
*H01M 8/065* (2016.01)

(52) U.S. Cl.
CPC ............. *C01B 3/065* (2013.01); *H01M 8/065* (2013.01); *C01B 2203/066* (2013.01);
(Continued)

(58) Field of Classification Search
CPC ........ B01J 23/755; B01J 35/10; B01J 37/348; B01J 23/462; C01B 3/06; C01B 3/065;
(Continued)

(56) References Cited

U.S. PATENT DOCUMENTS 5,372,617 A    12/1994 Kerrebrock et al.
2002/0081235 A1  6/2002 Baldwin et al.
(Continued)

FOREIGN PATENT DOCUMENTS

CN    106334561 A  *  1/2017
CN    113387327 A     9/2021
(Continued)

OTHER PUBLICATIONS

Keceli et al. "Ruthenium(III) acetylacetonate: A homogeneous catalyst in the hydrolysis of sodium borohydride", Journal of Molecular Catalysis A: Chemical 286 (2008) 87-91 (Year: 2008).*
(Continued)

*Primary Examiner* — Steven J Bos
*Assistant Examiner* — Syed T Iqbal
(74) *Attorney, Agent, or Firm* — LEMPIA SUMMERFIELD KATZ LLC (57) ABSTRACT

A hydrogen generating method includes generating hydrogen by dehydrogenation-reacting a chemical hydride of a solid state with an acid aqueous solution. The dehydrogenation-reaction is performed by reacting 1 mol of hydrogen atoms of the chemical hydride with an acid and water at a molar ratio of 0.5 to 2.

6 Claims, 10 Drawing Sheets

(52) U.S. Cl.
CPC .......... C01B 2203/1029 (2013.01); C01B 2203/1058 (2013.01); C01B 2203/1064 (2013.01); C01B 2203/1614 (2013.01); C01B 2203/1628 (2013.01)

(58) Field of Classification Search
CPC ...... C01B 2203/066; C01B 2203/1029; C01B 2203/1058; C01B 2203/1064; C01B 2203/1614; C01B 2203/1628; Y02R 60/36; H01M 8/065; Y02E 60/36; Y02E 60/50; Y02P 20/133
See application file for complete search history.

(56) References Cited

U.S. PATENT DOCUMENTS

| | | |
|---|---|---|
| 2005/0036941 A1 | 2/2005 | Bae et al. |
| 2007/0020172 A1 | 1/2007 | Withers-kirby et al. |
| 2007/0207085 A1 | 9/2007 | Troczynski |
| 2011/0194992 A1* | 8/2011 | Barton .............. F17C 11/005 422/239 |
| 2015/0207160 A1 | 7/2015 | Masetti-placci et al. |
| 2021/0299627 A1 | 9/2021 | Nam et al. |
| 2022/0115682 A1 | 4/2022 | Allinson et al. |

FOREIGN PATENT DOCUMENTS

| | | |
|---|---|---|
| KR | 101584518 B1 | 1/2016 |
| WO | 2005102914 A2 | 11/2005 |
| WO | 2007136629 A2 | 11/2007 |

OTHER PUBLICATIONS

Murugesan et al. "Effects of acid accelerators on hydrogen generation from solid sodium borohydride using small devices" Journal of Power Sources 187 (2009) 216-223 (Year: 2009).*

M. Niermann et al., Liquid organic hydrogen carriers (LOHCs)—techno-economic analysis of LOHCs in a defined process chain, Energy Environ. Sci., 2019, 12; https://doi.org/10.1039/C8EE02700E; 18 pp.

Soon-Mo Kwon et al., Development of a high storage-density hydrogen generator using solid-state NaBH4 as a hydrogen source for unmanned aerial vehicles, Applied Energy; vol. 251, Oct. 1, 2019, https://doi.org/10.1016/j.apenergy.2019.113331; 9 pp.

Notice of Allowance cited in U.S. Appl. No. 17/348,578; dated Oct. 5, 2022; 7pp.

Office Action cited in U.S. Appl. No. 17/348,552; dated Jan. 17, 2023; 11 pp.

1Dffice Action cited in U.S. Appl. No. 17/348,552; dated Apr. 28, 2023; 12 pp.

* cited by examiner

METHOD FOR GENERATING HYDROGEN

CROSS-REFERENCE TO RELATED APPLICATION

This application claims priority to and the benefit of Korean Patent Application No. 10-2021-0017385 filed in the Korean Intellectual Property Office on Feb. 8, 2021, the entire contents of which are incorporated herein by reference.

BACKGROUND

(a) Field of the Disclosure

The present disclosure relates to a hydrogen generating method for supplying hydrogen to a fuel cell stack.

(b) Description of the Related Art

Due to depletion of fossil energy and environmental pollution problems, there is a great demand for renewable and alternative energy, and hydrogen is attracting attention as one of such alternative energies.

A fuel cell and a hydrogen combustion device use hydrogen as a reaction gas, and in order to apply the fuel cell and the hydrogen combustion device to vehicles and various electronic products for example, a stable and continuous supply technology of hydrogen is required.

In order to supply hydrogen to a device that uses hydrogen, a method of receiving hydrogen from a separately installed hydrogen supply source may be used. In this way, compressed hydrogen or liquefied hydrogen may be used.

Alternatively, a method of generating hydrogen through a reaction of a corresponding material after mounting a material in which hydrogen is stored on a device using hydrogen and supplying it to the device using hydrogen may be used. For this method, it is proposed to use a chemical hydrogen storage material including a liquid hydride or a solid hydride.

On the other hand, sodium borohydride ($NaBH_4$) is a solid hydrogen storage material capable of generating hydrogen with a high density of about 10.9 wt % based on a material during a hydrolysis reaction with 2 mol of water (based on 1 mol of sodium borohydride). However, in the hydrolysis reaction using an existing non-uniform catalyst (platinum (Pt), nickel (Ni), Cobalt (Co), etc.), there is a condition in which 80 wt % or greater of water may be contained as a method to secure the continuity of the reaction. In this case, the hydrogen storage capacity compared to the material may have a hydrogen storage capacity of 2 wt % to 3 wt % or greater, which is significantly lower than an intrinsic storage capacity of sodium borohydride.

Meanwhile, an acid may be used as a catalyst for the hydrolysis reaction of sodium borohydride in place of the solid non-uniform catalyst. However, this reaction is a strong exothermic reaction, and then the water is easily evaporated by an elevated temperature and reactivity decreases, To prevent this, it is necessary to use an excessive amount of water. In addition, when strong acids (hydrogen chloride (HCl), sulfuric acid ($H_2SO_4$), nitric acid ($HNO_3$), etc,) are used to generate hydrogen, there is a high risk of corroding a metal and this may be a safety problem. To prevent this, a coating for corrosion resistance of the container containing acid may be additionally required, and dilution in a large amount of water is required to secure the safety of the acid.

The above information disclosed in this Background section is only for enhancement of understanding of the background of the disclosure, and therefore it may contain information that does not form the prior art that is already known in this country to a person of ordinary skill in the art.

SUMMARY

An embodiment is to provide a hydrogen generating method while preventing vaporization of water and reducing a usage amount of a water through a reaction at high temperature and high pressure conditions to maximize a hydrogen generating capacity relative to a material weight, and while reducing a possibility of corrosion in a reaction device to improve safety of a dehydrogenation reaction system.

According to an embodiment, a hydrogen generating method including generating hydrogen by dehydrogenation-reacting a chemical hydride of a solid state with an acid aqueous solution is provided. The dehydrogenation-reaction may be performed by reacting 1 mol of hydrogen atoms of the chemical hydride with an acid and water at a molar ratio of 0.5 to 2.

The chemical hydride may include sodium borohydride ($NaBH_4$), lithium borohydride ($LiBH_4$), potassium borohydride ($KBH_4$), ammonium borohydride ($NH_4BH_4$), ammonia borohydride ($NH_3BH_3$), tetramethyl ammonium borohydride (($CH_3)_4NH_4BH_4$), sodium aluminum hydride ($NaAlH_4$), lithium aluminum hydride ($LiAlH_4$), potassium aluminum hydride ($KAlH_4$) calcium diborohydride ($Ca(BH_4)_2$), magnesium diborohydride ($Mg(BH_4)_2$), sodium gallium hydride ($NaGaH_4$), lithium gallium hydride ($LiGaH_4$), potassium gallium hydride ($KGaH_4$), lithium hydride (LiH), calcium hydride ($CaH_2$), magnesium hydride ($MgH_2$), or a mixture thereof.

The acid may include sulfuric acid, nitric acid, phosphoric acid, hydrochloric acid, boric acid, a heteropoly acid, acetic acid, formic acid, malic acid, citric acid, tartaric acid, ascorbic acid, lactic acid, oxalic acid, succinic acid, a tauric acid, or a mixture thereof.

The temperature of the dehydrogenation reaction may be 10° C. to 400° C., and the pressure may be 1 bar to 100 bar.

The dehydrogenation reaction may be performed under a presence of a homogeneous catalyst including ruthenium (III) acetylacetonate ($Ru(acac)_3$); carbonylchlorohydrido{bis[2-(diphenyl phosphinomethyl)ethyl] amino} ruthenium (II); ruthenium(II) triphenylphosphine monosulfonate ($RuCl_2$(m-triphenylphosphine monosulfonate)$_2$); ruthenium (II) benzene; $RuCl_2$(benzene) with 1,2-bis(diphenylphosphino)methane, or a combination thereof.

A gas product generated in the dehydrogenation reaction may include 99 volume % or greater of hydrogen and 1 volume % or less of water.

The dehydrogenation reaction may be performed in a dehydrogenation reaction device including a dehydrogenation reactor including a chemical hydride of a solid state and an acid aqueous solution tank supplying the acid aqueous solution to the dehydrogenation reactor. The dehydrogenation reactor may include a heating device, a cooling apparatus, a porous metal foam, or a combination thereof.

The porous metal foam may be a porous nickel foam or a porous cobalt-nickel foam.

The acid aqueous solution may be supplied to the dehydrogenation reactor by gravity or a pump.

The hydrogen generating method according to an embodiment may maximize a hydrogen generating capacity relative to a material weight by being reacted under high temperature and high pressure conditions to prevent vaporization of water and reduce the usage amount of the water. The hydrogen generating method may also improve the safety of the system by reducing the risk of the corrosion of the reaction device. In addition, by using a homogeneous catalyst, hydrogen may be additionally generated from the material after the hydrolysis reaction of the chemical hydride and the acid.

DETAILED DESCRIPTION OF THE EMBODIMENTS

The advantages, features, and aspects that are described hereinafter should become apparent from the following description of the embodiments with reference to the accompanying drawings, which are set forth hereinafter. However, the present disclosure may be not limited to embodiments that are described herein. Although not specifically defined, all of the terms including the technical and scientific terms used herein have meanings understood by persons having ordinary skill in the art. The terms have specific meanings coinciding with related technical references and the present specification as well as lexical meanings. In other words, the terms are not to be construed as having idealized or formal meanings. Throughout the specification and claims which follow, unless explicitly described to the contrary, the word "comprise/include" or variations such as "comprises/includes" or "comprising/including" should be understood to imply the inclusion of stated elements but not the exclusion or any other elements.

The terms of a singular form may include plural forms unless referred to the contrary.

In the drawings, the thickness of layers, films, panels, regions, etc., are exaggerated for clarity. Like reference numerals designate like elements throughout the specification.

A hydrogen generating method according to an embodiment generates hydrogen by a dehydrogenation reaction of a chemical hydride of a solid state with an acid aqueous solution.

The chemical hydride 111 as a solid state may be any one shape among a powder, grains, beads, microcapsules, and pellets. When the chemical hydride 111 is stored in an aqueous solution (a concentration of the chemical hydride is, in one example, about 20 wt %), a large amount of the chemical hydride 111 may not be stored, but when the chemical hydride 111 is stored in the solid state, large capacity storage is possible.

The chemical hydride may be any compound that hydrolyzes to generate hydrogen and hydrolysate, for example, may include $NaBH_4$, $LiBH_4$, $KBH_4$, $NH_4BH_4$, $NH_3BH_3$, $(CH_3)_4NH_4BH_4$, $NaAlH_4$, $LiAlH_4$, $KAlH_4$, $Ca(BH_4)_2$, $Mg(BH_4)_2$, $NaGaH_4$, $LiGaH_4$, $KGaH_4$, $LiH$, $CaH_2$, $MgH_2$, or mixture thereof.

The acid aqueous solution shortens a half-life by adjusting the pH of the chemical hydride 111 to promote the dehydrogenation reaction.

The acid may be an inorganic acid such as sulfuric acid, nitric acid, phosphoric acid, boric acid, or hydrochloric acid, an organic acid such as a heteropolyacid, acetic acid, formic acid, malic acid, citric acid, tartaric acid, ascorbic acid, lactic acid, oxalic acid, succinic acid, and tauric acid, or mixtures thereof, and because the molecular weight is small compared to the hydrogen ion, the system weight may be reduced and formic acid (HCOOH) may be used as it is safer than hydrochloric acid in a high concentration state. In the case of formic acid, as a weak acid, the pH is maintained, in one example, at about 2 under the conditions described in the present disclosure, so it may be used relatively safely. In addition, the captured carbon dioxide may be obtained through hydrogenation, so it is an important material in terms of a recycling recirculating of carbon dioxide. In addition, formate is converted to bicarbonate through a dehydrogenation reaction, whereby additional hydrogen may be obtained by a hydrolysis reaction.

Figure 2:
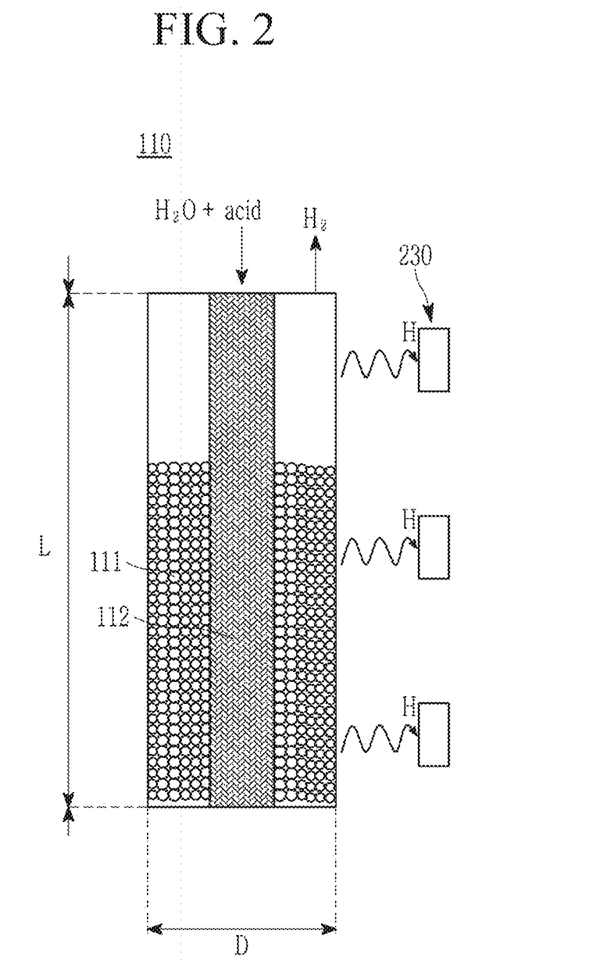
FIG. 2 is an enlarged cross-sectional view of a dehydrogenation reactor in FIG. 1.
Figure 3:
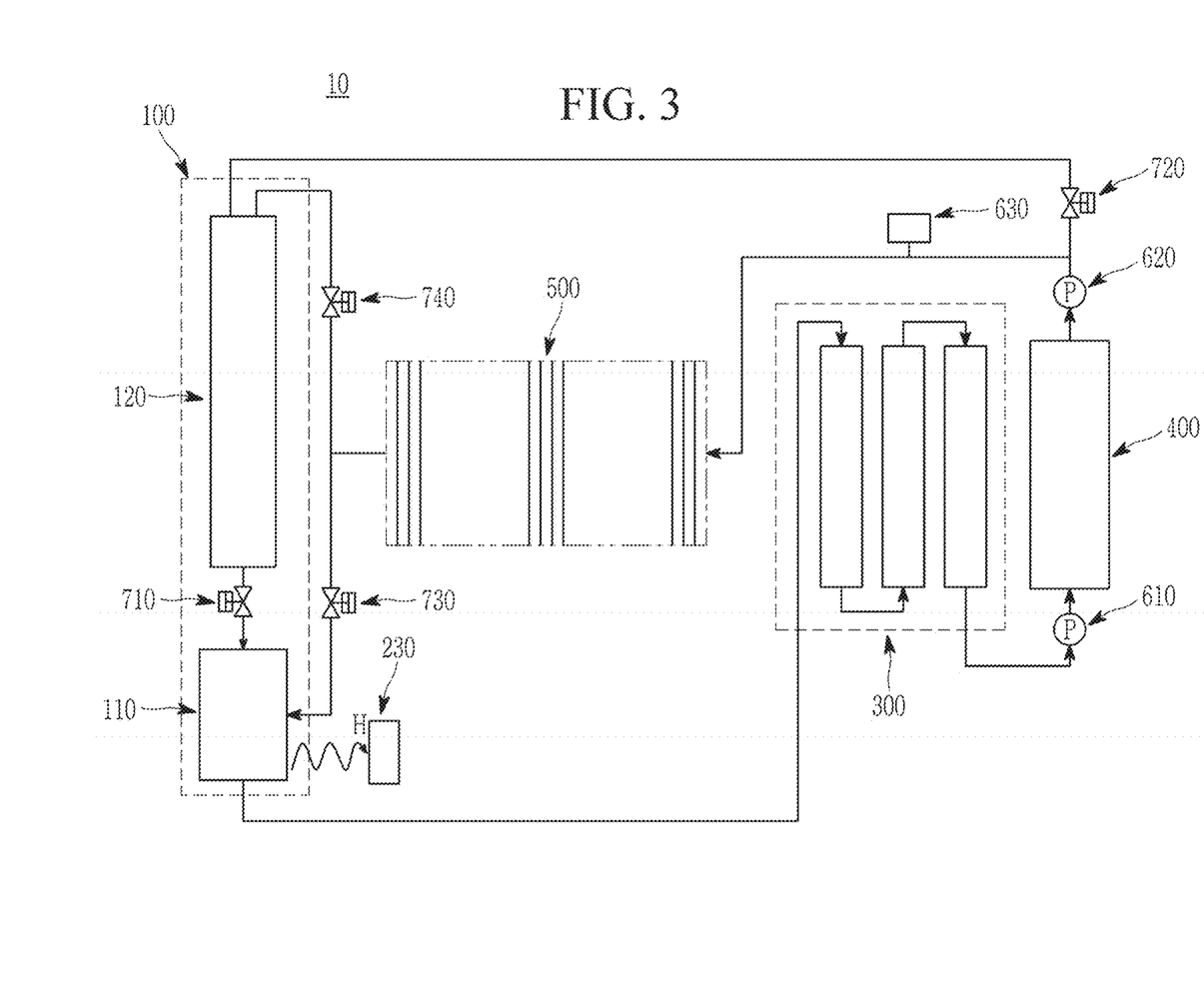
FIG. 3 is a view schematically showing a fuel cell-linked dehydrogenation reaction system.

For example, when the chemical hydride 111 of FIGS. 2 and 3 is $NaBH_4$ and the acid is HCOOH, the dehydrogenation reaction as shown in Reaction Formula 1 below occurs. Sodium borohydride is hydrolyzed to produce hydrogen and hydrolysates, and the acid aqueous solution facilitates the dehydrogenation reaction by supplying water used as a reaction product and protons that act as catalysts for a hydrogen production reaction from sodium borohydride.

$$NaBH_4 + HCOOH + 4H_2O \rightarrow HCOONa + H_3BO_3 + H_2O + 4H_2 \rightarrow HCO_3Na + H_3BO_3 + 5H_2 \quad \text{[Reaction Formula 1]}$$

In this way, when formic acid (HCOOH), which is a weak acid, is used as the acid, it is possible to improve the safety of the system by preventing device corrosion while improving the generated amount of hydrogen.

The dehydrogenation reaction may be performed by reacting 1 mol of hydrogen atoms of the chemical hydride with an acid and water at a molar ratio of 0.5 to 2 in the chemical hydride 111, thereby generating hydrogen at 4 mol or greater. If the molar ratio of acid and water is less than 0.5, the chemical hydride 111 may not react sufficiently, and if it is greater than 2, the system weight and reactor volume may increase.

On the other hand, when the acid the water are used to generate hydrogen in the hydrogen generating method, water is easily vaporized due to an exothermic reaction (a water vaporization temperature: 100° C. at 1 bar), so that the amount of hydrogen generated (i.e., a hydrogen storage capacity) may be deteriorated.

Therefore, the dehydrogenation reaction may take place under high temperature and high pressure conditions. This prevents vaporization of water and reduces the amount of the used water, thereby maximizing the amount of generated hydrogen (the water vaporization temperature: 175° C. at 10 bar, 260° C. at 50 bar). In addition, the generation of $CO_2$ may also be suppressed through the pressurized reaction.

Also, if excess water is included in a hydrogen gas after the reaction, a separate gas-liquid separator may be used, and accordingly the volume and weight of the entire system may be increased and then the hydrogen storage capacity may be decreased. However, it is possible to prevent water vaporization through a high temperature and high pressure reaction, thereby increasing hydrogen storage capacity and reducing system cost and weight.

For example, the temperature of the dehydrogenation reaction may be 10° C. to 400° C., or 10° C. to 250° C. If the temperature of the dehydrogenation reaction is less than 10° C., the reaction speed may be low, and if it is greater than 400° C., by-products such as carbon dioxide and carbon monoxide may be formed due to decomposition of the product.

The pressure of the dehydrogenation reaction may be 1 bar to 100 bar, or 5 bar to 50 bar. If the pressure of the dehydrogenation reaction is less than 1 bar, the hydrolysis reaction is inhibited due to the evaporation of the water at 100° C., resulting in a decrease in the hydrogen storage capacity. If it is greater than 100 bar, the price of parts and materials to maintain high pressure may increase.

Accordingly, the gas product generated in the dehydrogenation reactor may contain 99 volume % or greater of hydrogen, 1 volume % or less of water, and 0.1 volume % or less of other impurities.

The dehydrogenation reaction may take place in the presence of a ruthenium-based homogeneous catalyst to generate additional hydrogen. For example, the ruthenium-based homogeneous catalyst may include ruthenium(III) acetylacetonate (Ru(acac)$_3$); carbonylchlorohydrido {bis[2-(diphenyl phosphinomethyl) ethyl] amino} ruthenium(II); RuCl$_2$(m-triphenylphosphine monosulfonate)$_2$; ruthenium (II) benzene: RuCl$_2$(benzene) with 1,2-bis(diphenylphosphino)methane, or a combination thereof.

Meanwhile, the dehydrogenation reaction may be performed in a dehydrogenation reaction device including a dehydrogenation reactor containing the chemical hydride of the solid state and an acid aqueous solution tank supplying the acid aqueous solution to the dehydrogenation reactor.

Figure 1:
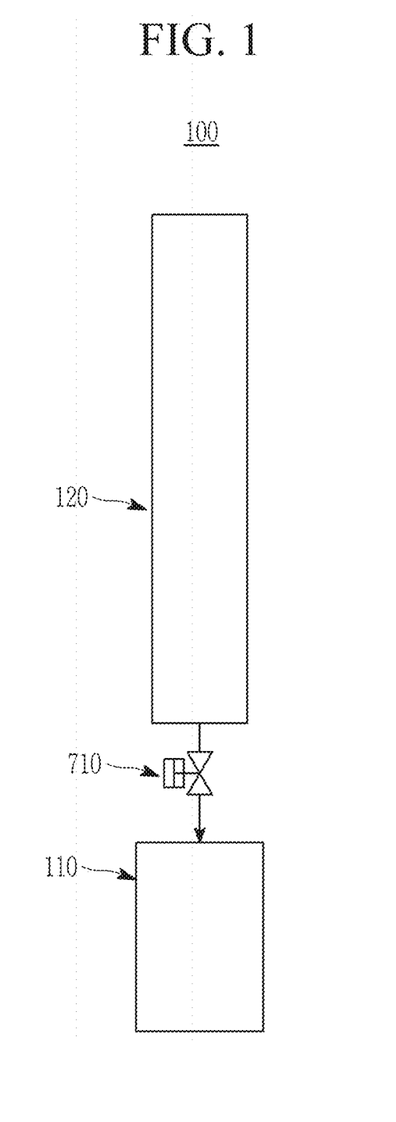
FIG. 1 is a view schematically showing a dehydrogenation reaction device.

FIG. 1 is a view schematically showing a dehydrogenation reaction device, and FIG. 2 is an enlarged cross-sectional view of a dehydrogenation reactor in FIG. 1. Now, the dehydrogenation reaction device is described in detail with reference to FIG. 1 and FIG. 2.

Referring to FIG. 1, the dehydrogenation reaction device 100 includes a dehydrogenation reactor 110 and an acid aqueous solution tank 120.

The dehydrogenation reactor 110 may be composed of a high temperature and high pressure vessel so that a dehydrogenation reaction may be carried out in high temperature and high pressure conditions. For example, the dehydrogenation reactor 110 may have a shape such as a cylinder, a sphere, a cuboid, or a polygonal column, and in one particular example may have a cylinder shape.

Referring to FIG. 2, the dehydrogenation reactor 110 may have a high aspect ratio in which a ratio L/D of a length L to a width D is high. Here, the width D of the dehydrogenation reactor 110 is less than the length L.

In the dehydrogenation reactor 110, the aspect ratio L/D of the length L to the width D may be 1 to 10. When the dehydrogenation reactor 110 has the high aspect ratio, it is possible to maximize a release of reaction heat during the dehydrogenation reaction and minimize the use of a pump by utilizing a water level difference.

The dehydrogenation reactor 110 includes a chemical hydride 111 of a solid state.

The dehydrogenation reactor 110 is cartridgeized to allow the dehydrogenation reactor 110 to be replaced, the upper part is designed to be opened and closed so that the chemical hydride 111 may be injected or replaced, or a product is exhausted through the lower part and the chemical hydride 111 may be injected, thereby allowing the dehydrogenation reactor 110 to ensure system continuity. Additionally, the dehydrogenation reactor 110 may further include a part for exhausting a slurried hydrolysis reaction product and a part for injecting the chemical hydride 111.

The dehydrogenation reactor 110 may include a heating device that provides heat/temperature useful for the hydrolysis of the chemical hydride 111 or for separate purposes, a cooling apparatus 230 to exhaust the reaction heat H when the hydrogen-generating reaction is an exothermic reaction, or a porous metal foam 112 to improve heat transfer and to increase the reaction speed through a catalysis reaction.

For example, the heating device may use electricity or other heat sources and the cooling apparatus 230 may be implemented as a refrigerant circulation device to exhaust heat generated by the hydrolysis of the chemical hydride 111.

The porous metal foam 112 has a cellular structure composed of a solid metal with gas-filled pores having a predetermined volume. The pores may be sealed (closed cell grooves) or interconnected (opened-cell foam), and the porous metal foam 112 may be opened-cell grooves. The porous metal foam 112 may have high porosity, and for example, only 5 volume % to 25 volume % of the entire volume may be metal. Accordingly, the porous metal foam 112 may be ultra-lightweight while having a high-profile area. In addition, the porous metal foam 112 may have various characteristics, for example, porosity, pore volume, thickness, alloy composition, or density. The porous metal foam 112 may be integrally formed, or may be disposed by stacking at least one or more thereof.

The porous metal foam 112 may use various materials in consideration of increasing a reaction speed through the catalytic action as well as heat conduction. For example, the porous metal foam 112 may be a porous nickel foam or a porous cobalt-nickel foam. The use of the porous nickel foam or the porous cobalt-nickel foam may be advantageous in that it may act as a heterogeneous catalyst that accelerates the hydrolysis of the chemical hydride. In the case of using the porous nickel foam or the porous cobalt-nickel foam, the heat transfer ay be accelerated and the reaction may be accelerated through the catalytic action of the metal. It may also help to release the heat of the reaction inside the dehydrogenation reactor 110. In addition, it may act as a distributor so that the acid aqueous solution may be evenly supplied inside the dehydrogenation reactor 110.

The porous metal foam 112 is positioned in the center of the width direction of the dehydrogenation reactor 110 and extends in the length direction of the dehydrogenation reactor 110. At this time, the chemical hydride 111 may be positioned on the outer side in the width direction of the dehydrogenation reactor 110, and the side in the length direction of the porous metal foam 112 may be surrounded by the chemical hydride 111.

In addition, the porous metal foam 112 may be connected to the inlet side through which the acid aqueous solution supplied from the acid aqueous solution tank 120 inflows. At this time, the opposite surface of the surface where the porous metal foam 112 is connected to the dehydrogenation reactor 110 may be surrounded by the chemical hydride 111.

The porous metal foam 112 uniformly distributes the acid aqueous solution to the chemical hydride 111, maximizes the heat transfer, and may act as a heterogeneous catalyst for the dehydrogenation reaction. Accordingly, a barrier may be suppressed from being formed by by-products such as a borate, which may be generated from the chemical hydride 111 after the dehydrogenation reaction and the reaction delay is minimized, thereby maximizing the generation amount of hydrogen.

The dehydrogenation reactor 110 may include the porous metal foam 112 in an amount of 0 to 100 parts by volume with respect to 100 parts by volume of the chemical hydride 111, and for example, it may include 0 to 50 parts by volume. If the porous metal foam 112 includes greater than 50 parts by volume per 100 parts by volume of the chemical hydride 111, the amount of the hydrogen storage may decrease due to space constraints.

The acid aqueous solution tank 120 supplies the acid aqueous solution to the dehydrogenation reactor 110. In other words, the dehydrogenation reaction device 100 is a system that generates hydrogen by injecting the aqueous acid solution into a dehydrogenation reactor 110 including the chemical hydride 111 of the solid state.

In addition, since a separate recovery tank in some cases may not be used, the cost and weight of the system may be reduced. In particular, there is a merit that it may be easily exhausted under pressure conditions above 100° C. and above atmospheric pressure when the product is present in the form of a slurry with high fluidity in the container.

The acid aqueous solution tank 120 may have a corrosion-resistant protective film such as Teflon coating to prevent corrosion by the acid aqueous solution.

The acid aqueous solution tank 120 is positioned above the dehydrogenation reactor 110 with respect to the direction of gravity, and the acid aqueous solution tank 120 may supply the acid aqueous solution to the dehydrogenation reactor 110 by gravity or a high pressure pump. In other words, the acid aqueous solution tank 120 may supply the acid aqueous solution to the dehydrogenation reactor 110 due to the water level difference. Through this, it is possible to reduce the system cost and weight by minimizing the use of the pump. However, the present disclosure is not limited thereto, and the add aqueous solution tank 120 may be positioned below the dehydrogenation reactor 110 in the gravity direction and the acid aqueous solution may be supplied to the dehydrogenation reactor 110 by a high pressure pump. In other words, when the acid aqueous solution is injected into the dehydrogenation reactor 110 through a high pressure pump, the pressurization of the acid aqueous solution tank may be omitted, and in this case, the position limitation also disappears.

For this purpose, the acid aqueous solution tank 120 may have the same pressure as the dehydrogenation reactor 110 or higher than the pressure of the dehydrogenation reactor 110, and a valve 710 such as a solenoid valve may be mounted between the acid aqueous solution tank 120 and the dehydrogenation reactor 110. In this case, the acid aqueous solution tank 120 does not need to be positioned on the dehydrogenation reactor 110 and may be disposed in a position equivalent to or lower than that of the dehydrogenation reactor 110. For example, the pressurization of the acid aqueous solution tank 120 may be performed by using hydrogen generated in the dehydrogenation reactor 110. Instead of using the above methods, the acidic aqueous solution at atmospheric pressure may be injected into the dehydrogenation reactor 110 using a high pressure pump.

The generation speed of hydrogen in the dehydrogenation reactor 100 may be controlled by changing the injection speed of the acid aqueous solution or by changing the injection time (a valve open time) while fixing the injection speed. Accordingly, since it is not necessary to use a separate pump, the cost and weight of the system may be reduced.

The hydrogen generating reaction may be performed in the dehydrogenation reaction system for supplying hydrogen to the fuel cell stack.

FIG. 3 is a view schematically showing a fuel cell-linked dehydrogenation reaction system. Next, a fuel cell-linked dehydrogenation reaction system is described in detail with reference to FIG. 3.

Referring to FIG. 3, the dehydrogenation reaction system 10 includes the dehydrogenation reactor 110, the acid aqueous solution tank 120, and the fuel cell stack 500, and may selectively further include a gas cooler 300 and a buffer tank 400.

Since the description of the dehydrogenation reactor 110 and the acid aqueous solution tank 120 is the same as described above, the repeated description is omitted.

The dehydrogenation reactor 110 may increase the amount of hydrogen storage by disposing several reactors in parallel as desired.

Hydrogen generated from the dehydrogenation reactor 110 is transferred to the gas cooler 300. The gas cooler 300 cools the supplied hydrogen. The cooling temperature of hydrogen is not particularly limited in the present disclosure, and as an example, it may be a room temperature of 10° C. to 60° C.

FIG. 3 shows that the gas cooler 300 is configured of a plurality of chambers sequentially connected to each other, but the present disclosure is not limited thereto, and the gas cooler 300 may be configured of a single chamber.

The hydrogen cooled in the gas cooler 300 is transferred to the buffer tank 400. The buffer tank 400 receives and stores a certain amount of the hydrogen gas.

If useful, between the dehydrogenation reactor 100 and the gas cooler 300, between the gas cooler 300 and the buffer tank 400, between the buffer tank 400 and the fuel cell stack 500, or a combination thereof, pressure regulators 610 and 620 may be further included. A sensor, a temperature sensor, or a pressure sensor may be further included inside or outside the dehydrogenation reactor 100 A mass flow meter 630 may be further included between the buffer tank 400 and the fuel cell stack 500. Accordingly, the hydrogen gas may be stored in the buffer tank 400 at a constant pressure, and the hydrogen gas may be supplied to the fuel cell stack 500 at a desired pressure and mass.

Meanwhile, as described above, the acid aqueous solution tank 120 may be pressurized by using hydrogen generated in the dehydrogenation reactor 110, and the acid aqueous solution tank 120 may receive hydrogen directly from the dehydrogenation reactor 110, or may receive the hydrogen from the gas cooler 300, the buffer tank 400, or a combination thereof. At this time, the amount of hydrogen gas supplied to the acid aqueous solution tank 120 may be controlled by the valve 720.

The fuel cell stack 500 is positioned on a downstream side of the buffer tank 400 to receive the hydrogen gas from the buffer tank 400. For example, the hydrogen gas may be received from the buffer tank 400 through an intake port such as a valve.

The fuel cell stack 500 generates water by reacting the supplied hydrogen with oxygen and simultaneously generates electrical energy. The water produced in the fuel cell stack 500 is exhausted through exhaust means such as valves, for example. At this time, the water exhausted from the fuel cell stack 500 is recycled to the acid aqueous solution tank 120, the dehydrogenation reactor 110, a separate water tank, or all of them, thereby increasing the hydrogen generation efficiency. At this time, the amount of the water supplied to the acid aqueous solution tank 120 or the dehydrogenation reactor 110 may be controlled by valves 730 and 740.

The fuel cell stack 500 may be any device that converts the hydrogen gas into usable electrical energy, for example, and it may be a proton exchange membrane fuel cell (PEMFC), an alkaline fuel cell (AFC), a phosphoric acid fuel cell (PAFC), a molten carbonate salt fuel cell, (MCFC), or a solid oxide fuel cell (SOFC), etc., but the present disclosure is not limited thereto.

For example, the fuel cell stack 500 may pass the generated electrical energy through a power converter such as a DC converter, an inverter, or a charge controller. The power converter may output a part of the electrical energy to an electrical load through a load interconnect, and the other part of the electrical energy may be sent back to the energy storage through a recharging interconnect. Another part of the electrical energy may be used to supply power to a control unit.

The dehydrogenation reaction system 10 prevents the vaporization of the water through the high temperature and high pressure operation of the dehydrogenation reactor 100 and reduces the amount of the used water. Thus, there is no need for a separate gas-liquid separator because the excess water is not included in the hydrogen gas after the reaction.

In the dehydrogenation reaction system 10, the use of the pump may be minimized by allowing the acid aqueous solution tank 120 to supply the acid aqueous solution to the bottom of the dehydrogenation reactor 110 by gravity, however if desirable, a pump, a filter, or both may be further included.

For example, the pump may be used to supply the acid aqueous solution of the acid aqueous solution tank 120 to the dehydrogenation reactor 110, to supply the hydrogen gas generated from the dehydrogenation reactor 110 to the gas cooler 300, to supply the hydrogen gas cooled in the gas cooler 300 to the buffer tank 400, to supply the hydrogen gas stored in the buffer tank 400 to the fuel cell stack 500, to supply the hydrogen gas to the acid aqueous solution tank 120, or to supply the water generated from the fuel cell stack 500 to the dehydrogenation reactor 110 or the acid aqueous solution tank 120.

The filter may substantially remove unwanted particles included in the hydrogen gas by filtering the generated hydrogen gas. The filter may be positioned between the dehydrogenation reactor 110, the gas cooler 300, the buffer tank 400, or the fuel cell stack 500, particularly between the buffer tank 400 and the fuel cell stack 500.

In addition, optionally, the dehydrogenation reaction system 10 may include an outlet for exhausting the mixture of the chemical hydride, the acid, and the water after the reaction has been completed, and may include a device for removing reaction by-products other than hydrogen and the water or converting it to other materials.

Hereinafter, specific embodiments of the disclosure are presented. However, the embodiments described below are only intended to specifically illustrate or describe the disclosure, and this should not limit the scope of the disclosure.

(Evaluation Method of Dehydrogenation Reaction)

The chemical hydride 111 is charged into the high temperature and high pressure dehydrogenation reactor 110. The acid aqueous solution mixed in a specific molar ratio is injected using a syringe or a high-pressure pump. At this time, the injection speed may be adjusted from 0.01 mL/min to 20 mL/min, and may vary depending on the size of the dehydrogenation reactor 110 and the amount of chemical hydride 111.

The pressure and the temperature are measured, and a predetermined pressure and temperature are maintained through valve control and cooling. In some cases, $H_2O$ may be injected first and then the acid may be injected.

The hydrogen conversion rate may be calculated by Equation 1 below, and the flow rate and the purity are measured using a mass flow meter and gas chromatography (GC).

The hydrogen conversion rate=((the amount of hydrogen exhausted to the outside of the reactor through the mass flow meter)+(the pressure at the room temperature after the reaction)×(the reactor volume)/(the theoretical hydrogen production amount)     [Equation 1]

Embodiment 1

Figure 4:
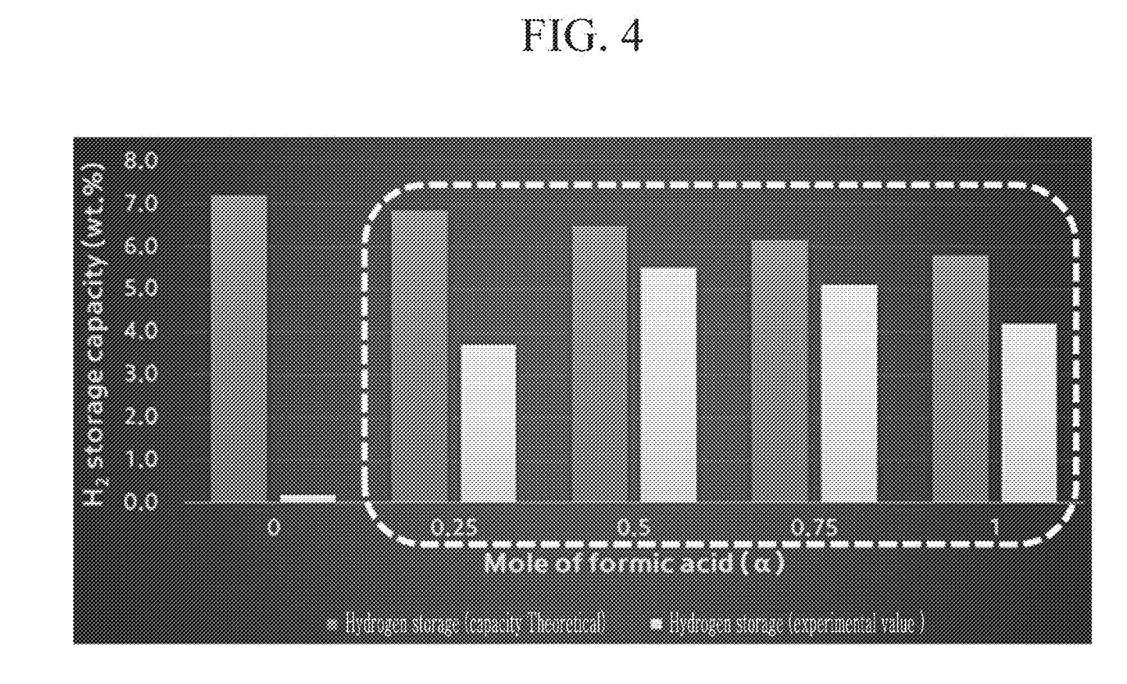
FIG. 4 is a graph showing a result of measuring a hydrogen storage capacity of a dehydrogenation reaction in an Embodiment 1.

By using the dehydrogenation reaction system 10, in the room temperature and the room pressure condition, the dehydrogenation reaction was performed by using $NaBH_4$ as the chemical hydride 111 and HCOOH as the acid, and at this time, the hydrogen storage capacity (the $H_2$ storage capacity, wt %) was measured by performing the dehydrogenation reaction while changing the reaction molar ratio of $NaBH_4:\alpha HCOOH:\beta H_2O$ to $0 \le \alpha \le 1$, $3 \le \beta \le 4$ and $\alpha\beta=4$, and the result is shown in FIG. 4.

Referring to FIG. 4, in Embodiment 1, the reaction like Reaction Formula 2 below is performed, in the room temperature/room pressure condition, a reaction molar sum of HCOOH and $H_2O$ is maintained as 4 (for example, to minimize water usage), as the reacted result, it was confirmed that hydrogen was generated under the condition of 0.25 mol to 1 mol of HCOOH, and hydrogen, which was close to the theoretical storage amount, was generated particularly at 0.5 mol.

[Reaction Formula 2]

$$NaBH_4 + \alpha HCOOH + \beta H_2O \rightarrow \alpha HCOONa + \frac{(1-\alpha)}{x} Na_x B_y O_z \cdot \gamma H_2O + 4H_2 \uparrow$$

Embodiment 2

Figure 5:
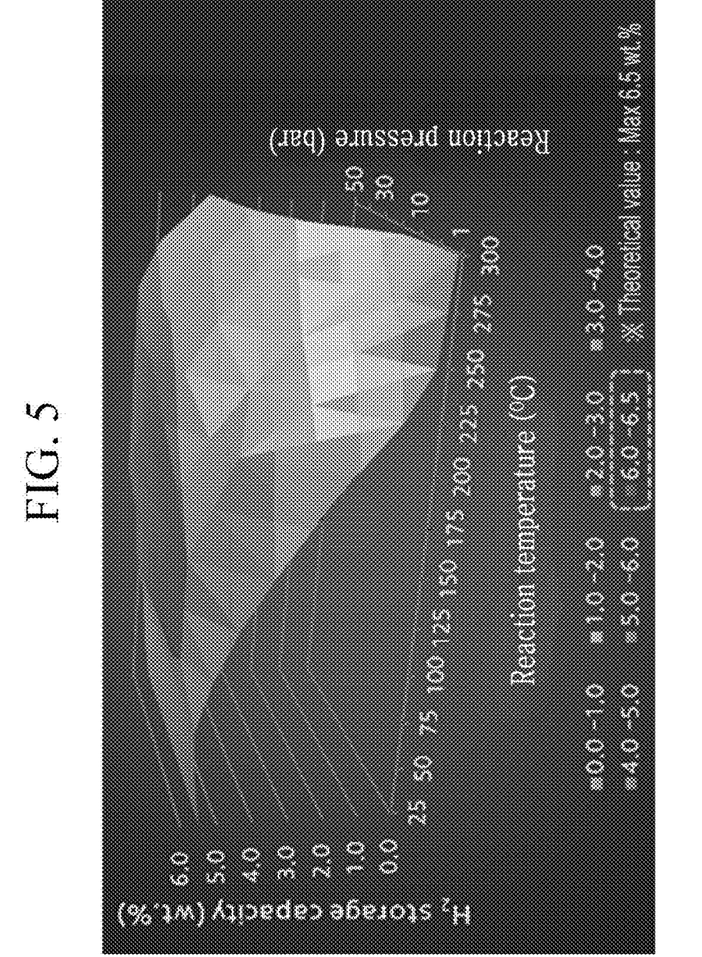
FIG. 5 is a graph showing a result measuring a hydrogen storage capacity of a dehydrogenation reaction in an Embodiment 2.

The reaction molar ratio of $NaBH_4:\alpha HCOOH:\beta H_2O$ is fixed as $\alpha=0.5$, $\beta=3.5$, while changing the temperature to 25° C. to 300° C. and the pressure to 1 bar to 50 bar, the hydrogen storage capacity was measured, and the result thereof is shown FIG. 5.

Referring to FIG. 5, in order to obtain the same hydrogen generation amount as the theoretical value by preventing the water vaporization, the reaction temperature and pressure were increased, and as the result of confirming the optimum reaction condition, the hydrogen storage capacity of 6 wt % or greater (theoretical value: 6.5 wt %) was confirmed in the temperature of 100° C. to 250° C. and the pressure of 5 bar to 50 bar, and particularly, the conversion rate of 100% was achieved at the range of 100° C. to 250° C. and 30 bar to 50 bar.

Embodiment 3

Figure 6:
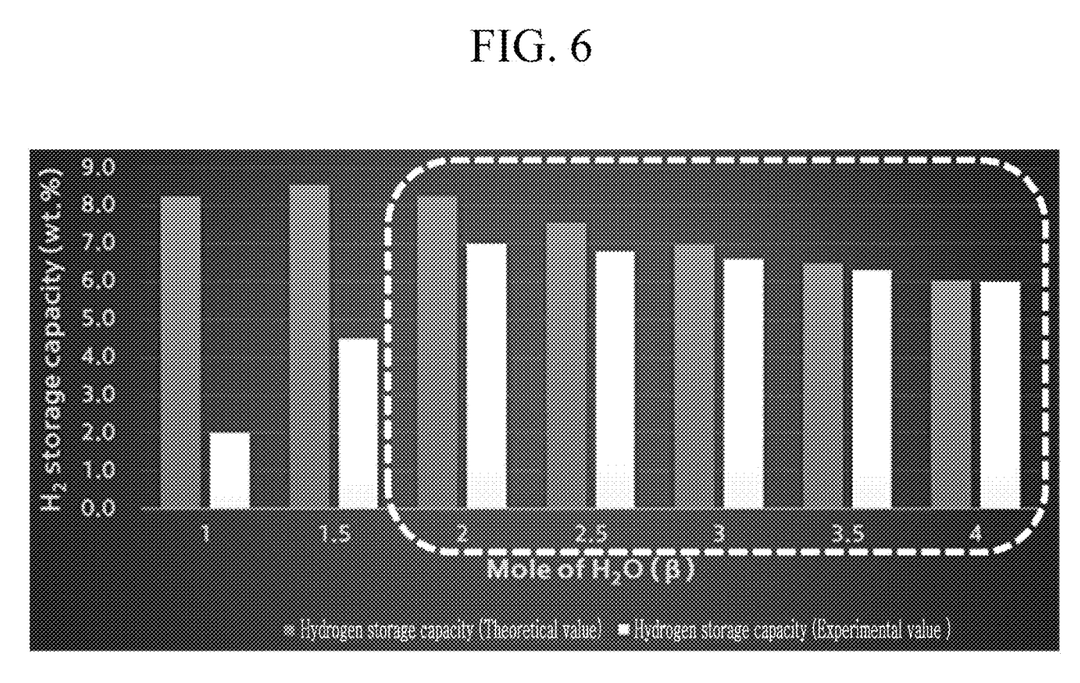
FIG. 6 is a graph showing a result of measuring a hydrogen storage capacity of a dehydrogenation reaction in an Embodiment 3.

In the condition of 180° C. and 30 bar, while changing the reaction molar ratio of $NaBH_4:\alpha HCOOH:\beta H_2O$ into $0\leq\alpha\leq0.7$, $1.8\leq\beta\leq2.5$, and $\alpha+\beta=2.5$, the hydrogen storage capacity was measured and the result thereof is shown in FIG. 6.

Referring to FIG. 6, as the result of checking the condition for the minimization of the usage amount of the water under high temperature/high pressure condition, in the case of HCOOH of 0.5 mol, $H_2O$ may be reduced to 2 mol, the hydrogen storage capacity may theoretically reach up to 8.3 wt % and experimentally up to 7.0 wt % (the room temperature/room pressure condition: 5.5 wt %).

Embodiment 4

Figure 7:
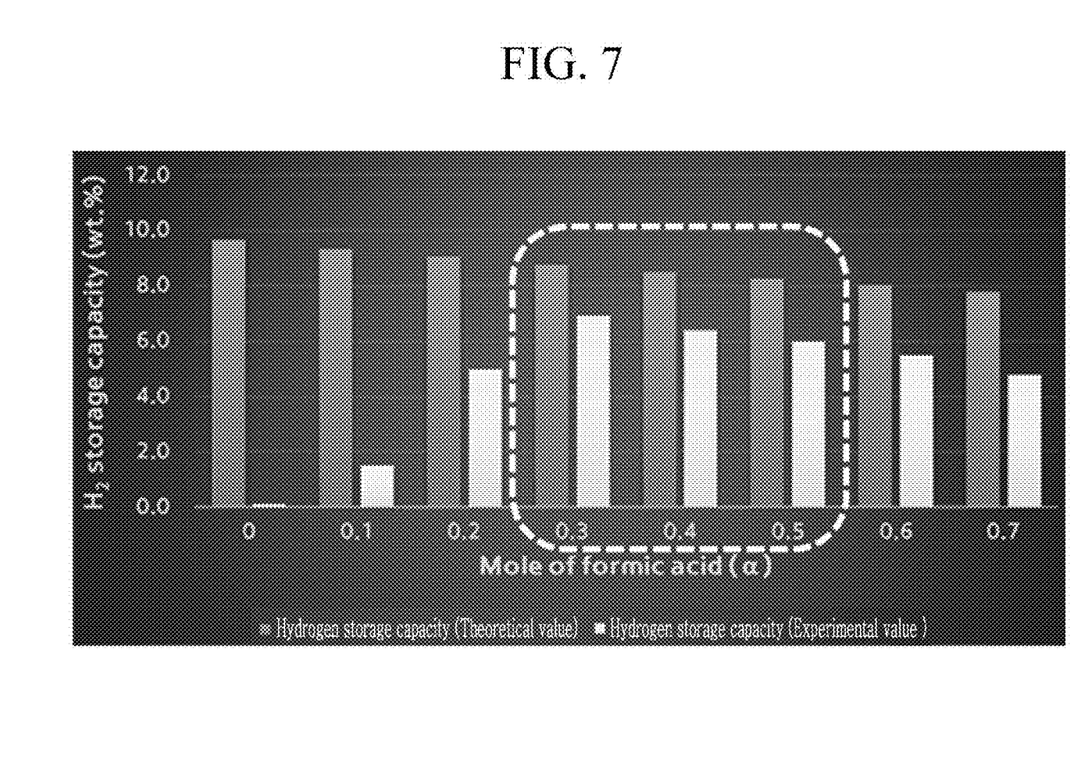
FIG. 7 is a graph showing a result of measuring a hydrogen storage capacity of a dehydrogenation reaction in an Embodiment 4.

In the condition of 180° C. and 30 bar, while changing the reaction molar ratio of $NaBH_4:\alpha HCOOH:\beta H_2O$ into $0\leq\alpha\leq0.7$, $1.8\leq\beta\leq2.5$, and $\alpha+\beta=2.5$, the hydrogen storage capacity was measured and the result thereof is shown in FIG. 7.

Referring to FIG. 7, for the minimization of the usage amount of the water, after fixing the molar ratio sum of HCOOH and $H_2O$ as 2.5, as a result of measuring the amount of hydrogen generated according to the HCOOH molar ratio, it was confirmed that the hydrogen storage capacity was 6 wt % or greater in the range of 0.3 mol to 0.5 mol of HCOOH.

Embodiment 5

Figure 8:
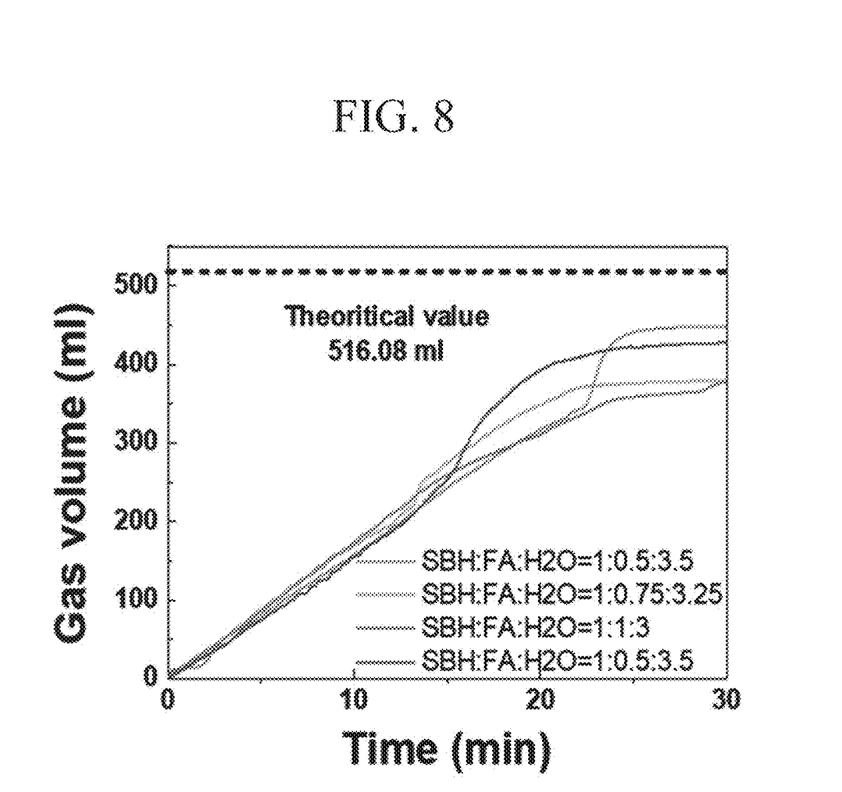
FIG. 8 is a graph showing a result of measuring a hydrogen storage capacity of a dehydrogenation reaction in an Embodiment 5.

The conversion rate was measured while changing the molar ratio of $NaBH_4:HCOOH:H_2O$ to 1:0.5:3.5, 1:0.75:3.25 and 1:1:3 respectively under room temperature and atmospheric pressure conditions, and the result is shown in FIG. 8 and summarized in Table 1.

In FIG. 8, SBH represents $NaBH_4$, FA represents HCOOH, and among two results with the mol ratio of 1:0.5:3.5, the first result is the result of mixing FA and $H_2O$ and the second result is the result of injecting FA after injecting $H_2O$.

TABLE 1

| $SBH:FA:H_2O$ | 1:0.5:3.5 | 1:0.75:3.25 | 1:1:3 |
|---|---|---|---|
| feed($NaBH_4$) injection amount | 0.2 g/0.434 ml | 0.2 g/0.434 ml | 0.2 g/0.434 ml |
| Starting temperature | 25° C. | 25° C. | 25° C. |
| Flow rate speed | 0.021 ml/min | 0.021 ml/min | 0.021 ml/min |
| Conversion rate | 86.2% | 82.8% | 72.9% |

Referring to FIG. 8 and Table 1, when the sum of the reaction molar ratios of HCOOH and $H_2O$ is fixed to 4 and the molar ratio is changed, it was confirmed that the hydrogen conversion rate is the best when the HCOOH molar ratio is 0.5 (the hydrogen storage capacity is at a 5.5 wt % level).

Embodiment 6

Figure 9:
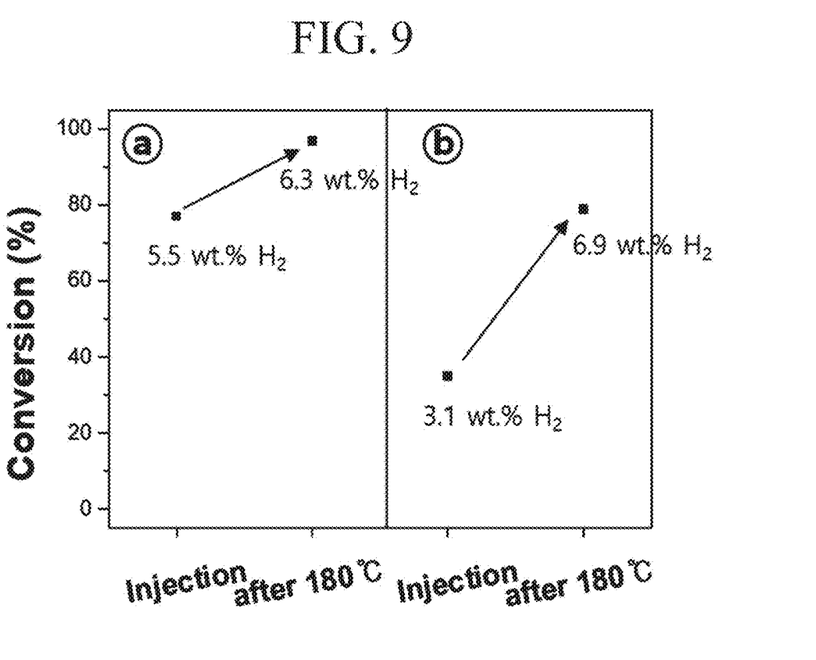
FIG. 9 is a graph showing a result of measuring a hydrogen conversion rate of a dehydrogenation reaction in an Embodiment 6.

For the case where the mol ratio of $NaBH_4:HCOOH:H_2O$ was 1:0.5:3.5 and 1:0.3:2.2, respectively, the conversion rate was measured while changing the reaction temperature from 25° C. to 180° C. at 30 bar, and the result is shown in FIG. 9 and summarized in Table 2.

In FIG. 9, ⓐ is a case that the mol ratio is 1:0.5:3.5 (theoretical $H_2$ storage amount: 6.5 wt %), ⓑ is a case where the mol ratio is 1:0.3:2.2 (theoretical $H_2$ storage amount: 8.8 wt %).

TABLE 2

| $SBH:FA:H_2O$ | ⓐ 1:0.5:3.5 | ⓑ 1:0.3:2.2 |
|---|---|---|
| feed($NaBH_4$) injection amount | 0.4 g/0.867 ml | 0.4 g/0.867 ml |
| Starting temperature -> increasing temperature | 25° C. -> 180° C. | 25° C. -> 180° C. |
| Flow rate speed | 1 ml/min | 1 ml/min |
| Conversion rate | 75% -> 97% | 35% -> 78% |

Referring to FIG. 9 and Table 2, when being evaluated as a high temperature/high pressure reactor, it may be confirmed that the hydrogen conversion rate is increased by 22% to 43% depending on the reaction molar ratio.

Embodiment 7

Figure 10:
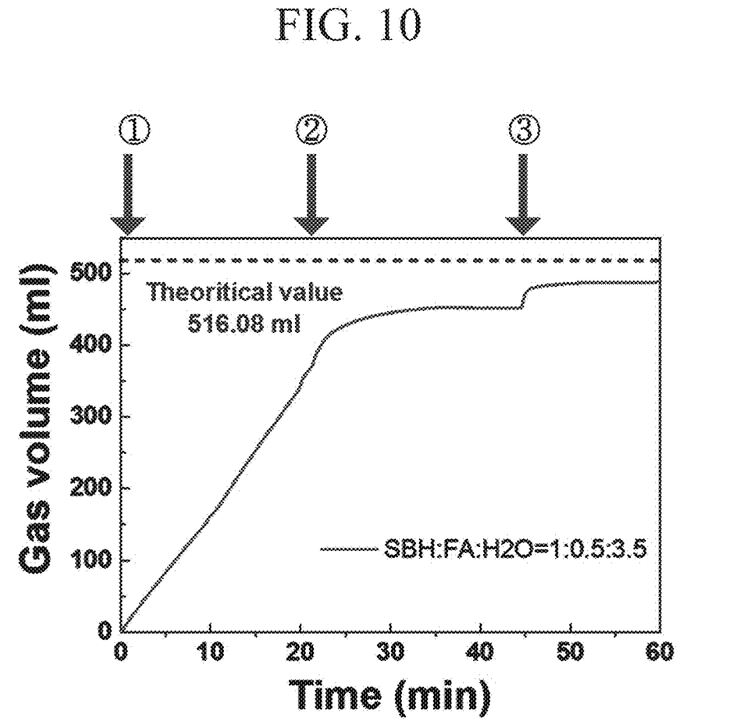
FIG. 10 is a graph showing a result of measuring a hydrogen conversion rate of a dehydrogenation reaction in an Embodiment 7.

To find out the change in the hydrogen conversion rate when using a catalyst, the conversion rate was measured (theoretical $H_2$ storage amount: 4.32 wt %) by injecting the catalyst including $Ru(acac)_3$ 2.6 mg and THF 1 mL with the molar ratio of $NaBH_4:Ru(acac)_3=800:1$ where the mol ratio of $NaBH_4:HCOOH:H_2O$ is 1:0.5:3.5.

In FIG. 10, SBH represents $NaBH_4$, FA represents HCOOH, ① represents $FA+H_2O$ injection timing, ② represents $FA+H_2O$ injection stopping timing, and ③ represents catalyst injection timing.

TABLE 3

| Experiment temperature (° C.) | 50 ($CO_2$-free condition) |
|---|---|
| Flow rate speed (mL/min) | 0.021 |
| FA, $H_2O$ mixture injection time | 20 minutes 36 seconds |
| $H_2$ generating equivalent (mol) | 3.8 |
| Generating (wt %) for $H_2$ weight | 6.2 |
| Final $NaBH_4$ conversion ratio (%) | 95 |

Referring to FIG. 10 and Table 3, it may be confirmed that the conversion rate increases from 87% before the catalyst injection to 95% after the catalyst injection.

Embodiment 8

The dehydrogenation reaction proceeded while changing the reaction condition as shown in Table 4 below, and the results are also summarized in Table 4.

TABLE 4

| Reaction condition | | | | | Hydrogen storage amount (wt %) (including NaBH$_4$, H$_2$O, HCOOH) | |
|---|---|---|---|---|---|---|
| Reaction molar ratio | temperature (° C.) | Pressure (bar) | Catalyst | | Theoretical value | Experiment value |
| NaBH$_4$ + 0.3HCOOH + 3.7H$_2$O → 0.3HCOONa + 0.3H$_3$BO$_3$ + 0.7NaB(OH)$_4$ + 4H$_2$ | 25 | 1 | X | | 6.8 | 5.8 |
| NaBH$_4$ + 0.5HCOOH + 3.5H$_2$O → 0.5HCOONa + 0.5H$_3$BO$_3$ + 0.5NaB(OH)$_4$ + 4H$_2$ | 25 | 1 | X | | 6.5 | 5.5 |
| NaBH$_4$ + 0.5HCOOH + 3.5H$_2$O → 0.5HCOONa + 0.25Na$_2$B$_4$O$_7$•1.75H$_2$O + 4H$_2$ | 180 | 30 | X | | 6.5 | 6.3 |
| NaBH$_4$ + 0.5HCOOH + 2.0H$_2$O → 0.5HCOONa + 0.25Na$_2$B$_4$O$_7$•0.25H$_2$O + 4H$_2$ | 180 | 30 | X | | 8.3 | 7.0 |
| NaBH$_4$ + 0.3HCOOH + 2.2H$_2$O → 0.3HCOONa + 0.3HBO$_2$ + 0.7(NaBO$_2$•0.33H$_2$O) + 4H$_2$ | 180 | 30 | X | | 8.8 | 6 |
| NaBH$_4$ + 0.5HCOOH + 3.5H$_2$O → 0.5HCO$_3$Na + 0.5H$_3$BO$_3$ + 0.5NaB(OH)$_4$ + 4.5H$_2$ | 65 | 1 | Ru(acac)$_3$ | | 7.3 | 7.0 |
| NaBH$_4$ + HCOOH + 4H$_2$O → HCO$_3$Na + H$_3$BO$_3$ + 5H$_2$ | 25 | 1 | | | 6.5 | 5.4 |

Referring to Table 4, it may be confirmed that the hydrogen generation amount was improved to 6.9 wt % by preventing the water vaporization and improving the reactivity under the high temperature/high pressure conditions, and it may be confirmed that the hydrogen generation amount was improved to 7.0 wt % by using a Ru(acac)$_3$ catalyst.

Embodiment 9

As in Reaction Formula 3 and Reaction Formula 4 below, the activities of weak acids (HCOOH) and strong acids (H$_2$SO$_4$, HCl) in a solution having the same pH were compared and the results are shown in Table 5.

NaBH$_4$+0.5HCOOH+3.5H$_2$O→0.5HCOOONa+ 0.5H$_3$BO$_3$+4H$_2$+0.5NaB(OH)$_4$ (pH=2) [Reaction Formula 3]

NaBH$_4$+0.00381 HCl+3.99619 H$_2$O→0.00381 NaCl+0.99619 NaB(OH)$_4$+0.00381 B(OH)$_3$+ 4H$_2$ [Reaction Formula 4]

TABLE 5

| | HCOOH (pK$_a$ = 3.75) | HCl (pK$_a$ = −6.3) | H$_2$SO$_4$ (pK$_a$ = −2.8) |
|---|---|---|---|
| pH | 2 | 2 | 2 |
| Concentration | 12M | 0.01M | 0.01M |
| Starting temperature | 25° C. | 25° C. | 25° C. |
| Flow rate speed | 0.021 ml/min | 0.021 ml/min | 0021 ml/min |
| Conversion rate | 85% | 4% | 1% |

Referring to Table 5, it may be confirmed that it is advantageous in terms of the hydrogen storage capacity when using HCOOH versus the strong acid in the same pH. In addition, in the case of the strong acids, it may be confirmed that the excess of water used when increasing the pH of the solution results in a decrease in the hydrogen storage capacity. Accordingly, it may be confirmed that the safety may be obtained by activating the weak acid HCOOH and the system corrosion concern may be reduced.

While this disclosure has been described in connection with what is presently considered to be practical embodiments, it is to be understood that the disclosure is not limited to the disclosed embodiments. On the contrary, the present disclosure is intended to cover various modifications and equivalent arrangements included within the spirit and scope of the appended claims.

DESCRIPTION OF SYMBOLS

10: dehydrogenation reaction system
100: dehydrogenation reaction device
110: dehydrogenation reactor
111: chemical hydride
112: porous metal foam
120: acid aqueous solution tank
230: cooling apparatus
300: gas cooler
400: buffer tank
500: fuel cell stack
610, 620: pressure regulator
630: mass flow meter
710, 720, 730, 740: valve

What is claimed is:

1. A hydrogen generating method comprising:
generating hydrogen by a dehydrogenation reaction of a chemical hydride of a solid state with an acid aqueous solution,
wherein the dehydrogenation reaction is performed by reacting 1 mol of hydrogen atoms of the chemical hydride with an acid and water at a molar ratio of 0.5 to 2,
wherein the chemical hydride comprises NaBH$_4$,
wherein the acid comprises formic acid, and wherein a temperature of the dehydrogenation reaction is in a range of 10° C. to 400° C., and a pressure of the dehydrogenation reaction is in a range of 1 bar to 100 bar.

2. The hydrogen generating method of claim 1, wherein the dehydrogenation reaction is performed under a presence of a homogeneous catalyst comprising ruthenium(III) acetylacetonate ($Ru(acac)_3$); carbonylchlorohydrido {bis[2-(diphenyl phosphinomethyl)ethyl] amino} ruthenium(II); ruthenium(II) triphenylphosphine monosulfonate ($RuCl_2$(m-triphenylphosphine monosulfonate)$_2$); ruthenium(II) benzene; $RuCl_2$(benzene) with 1,2-bis(diphenylphosphino)methane, or a combination thereof.

3. The hydrogen generating method of claim 1, wherein a gas product generated in the dehydrogenation reaction comprises 99 volume % or greater of hydrogen and 1 volume % or less of water.

4. The hydrogen generating method of claim 1, wherein the dehydrogenation reaction is performed in a dehydrogenation reaction device comprising a dehydrogenation reactor & having the chemical hydride of the solid state and an acid aqueous solution tank supplying the acid aqueous solution to the dehydrogenation reactor, and wherein the dehydrogenation reactor comprises a heating device, a cooling apparatus, a porous metal foam, or a combination thereof.

5. The hydrogen generating method of claim 4, wherein the porous metal foam is a porous nickel foam or a porous cobalt-nickel foam.

6. The hydrogen generating method of claim 4, wherein the acid aqueous solution is supplied to the dehydrogenation reactor by gravity or a pump.

\* \* \* \* \*

UNITED STATES PATENT AND TRADEMARK OFFICE
CERTIFICATE OF CORRECTION

| | |
|---|---|
| PATENT NO. | : 11,780,729 B2 |
| APPLICATION NO. | : 17/348539 |
| DATED | : October 10, 2023 |
| INVENTOR(S) | : Pyung Soon Kim et al. |

It is certified that error appears in the above-identified patent and that said Letters Patent is hereby corrected as shown below:

In the Claims

Column 15, Claim 4:
Line 21, please delete "&"

Signed and Sealed this
Sixth Day of February, 2024

*Katherine Kelly Vidal*

Katherine Kelly Vidal
*Director of the United States Patent and Trademark Office*